INVENTOR.
ROLAND JAMES BARLOW
BY
Oscar B Brumback
ATTORNEY

United States Patent Office 2,940,694
Patented June 14, 1960

2,940,694

ROLL CONTROL SYSTEM FOR AIRCRAFT

Roland James Barlow, River Edge, N.J., assignor to Bendix Aviation Corporation, Teterboro, N.J., a corporation of Delaware Filed Nov. 5, 1954, Ser. No. 467,153

7 Claims. (Cl. 244—77)

This invention relates generally to control systems and more particularly to control systems for correcting the manual control of a craft.

The control surfaces of aircraft, being usually limited to the trailing edges of the airfoil surfaces, present a problem in lateral control since the airfoil surfaces of high-speed aircraft are small, and the extent of the trailing edges is limited. While these small control surfaces operate satisfactorily at high speeds, their efficiency is lowered when the speed of the craft is reduced during take-offs and landings so the control surfaces do not always adequately compensate for large and infrequent moments disturbing the equilibrium of the craft. The efficiency of the control surfaces may be reduced still further should the surfaces be displaced to correct for the moment caused by the lowering of high lift flaps for take-off or landing. Thus, the control surfaces are not in a favorable position at this time to provide for lateral control. Therefore, as a result of the aerodynamic coupling existing between the yaw and roll axes of an aircraft any side slipping of the craft or yawing moment tends to cause the craft to roll.

An object of the present invention, therefore, is to provide a novel arrangement for stabilizing an aircraft about one axis by compensating for the coupling action due to moments about the other axis.

Another object is to provide a novel arrangement for stabilizing a craft while it is under manual control.

A further object is to provide a novel arrangement for driving a control surface to a safe position.

Another object is to provide a novel control system in which the neutral control position can be changed with changed flying conditions.

The present invention contemplates a novel arrangement by which the manual input for controlling the power means of an aircraft is automatically compensated in accordance with a function of the yaw condition of the craft so as to stabilize the roll attitude of the craft. The operative null position of the control arrangement for the surface may also be changed, depending upon the operating condition of the craft and, in the event of a failure in the electrical system, the surface may be driven to a safe position.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

Figure 1:
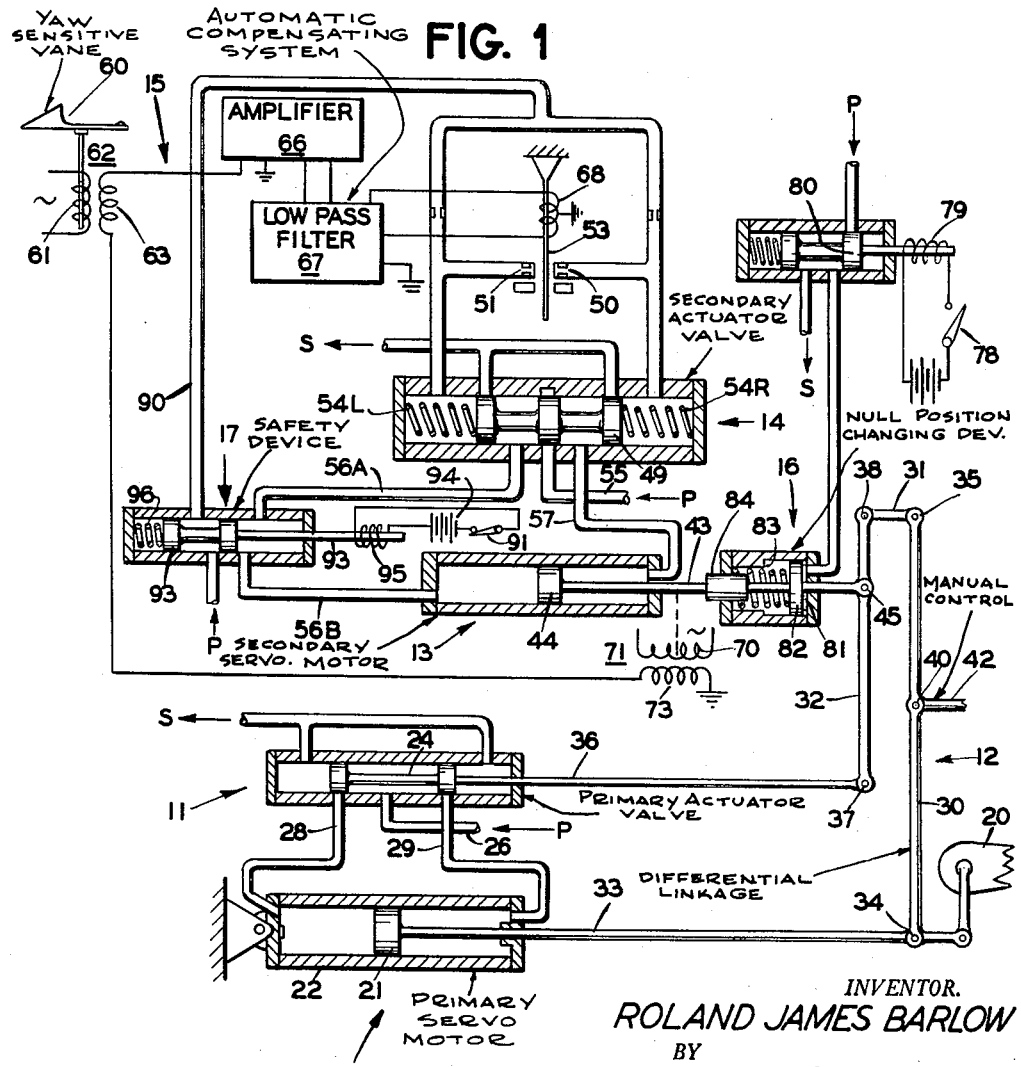
Fig. 1 illustrates schematically the novel control system of the present invention as applied to the control surface of an aircraft.

Turning now to Fig. 1 of the drawing, the system is comprised generally of a primary servomotor 10, a primary actuator 11, a differential linkage 12, a secondary servomotor 13, a secondary actuator 14, an automatic compensating system 15, a null position changing device 16, and a safety device 17. The source of pressure fluid P and the sump S are conventional and are not shown.

Servomotor 10 for displacing a control surface 20 may be conventional, having a piston 21 in a cylinder 22. The movement of a spool 24 in primary actuator 11 controls servomotor 10 by regulating the flow of pressure fluid P from conduit 26 to the conduits 28 and 29 leading to either side of piston 21.

Differential linkage 12, which positions spool 24, is comprised of members 30, 31 and 32. Member 30 is pivotally connected to shaft 33 of piston 21 by pin 34 and to member 31 by pin 35. Member 32 is pivotally connected to shaft 36 by pin 37 and to member 31 by pin 38. Member 30 is pivotally connected by pin 40 to a link 42 which is, in turn, connected to a conventional manual control column (not shown) in the craft and provides the manual input to the steering system. Member 32 is pivotally connected to the shaft 43 of piston 44 by a pin 45.

In the manual operation of surface 20, a movement of the conventional control column in the craft by way of link 42 pivots member 30 about pin 34. Member 31 links members 30 and 32 so that member 32 pivots about pin 45. This moves spool 24 to the right or left, depending upon the direction of manual input and permits the pressure fluid to flow to one side of piston 21. Piston 21 moves until the position of pin 34 is such that linkage 12 again centers valve 24. Surface 20 at this time has been moved to the position called for by the manual control and displacement of the surface stops.

While the above described system permits the aircraft to be maneuvered manually, it is difficult to stabilize the craft during landing conditions because of the lowered efficiency of the surfaces due to the reduced flying speeds. When this condition arises, the aircraft is unstable and any appreciable yaw condition tends to roll the craft; and a concentrated effort upon the part of the pilot is required to stabilize the craft. In accordance with the present invention, a novel arrangement is provided for sensing side slip or yaw condition of the craft and for stabilizing the craft by correcting the manual operation of the craft. In the embodiment of the present invention herein, the secondary ram 13 changes the position of pivot point 45, thereby correcting the manual input.

Ram 13 is automatically controlled by a transfer valve 14 which may be conventional; one type being described in U.S. Patent No. 2,625,136. In the present embodiment, armature 53 has a flapper valve portion which controls orifices 50 and 51. The valve portion when centered stabilizes spool 49 in centered position through the action of orifices 50 and 51. The movement of armature 53 in one direction or the other from center position sets up a differential pressure in chambers 54$^L$ and 54$^R$, correspondingly moving spool 49 to the right or to the left. Thus, movement of spool 49 controls the flow of pressure fluid from conduit 55 through conduits 56 or 57 to either side of piston 44. Armature 53 is moved in response to a yaw condition of the craft.

The yaw condition of the craft is sensed by a conventional vane 60 which is suitably mounted at the nose of the craft and tends to align itself with the relative wind; the direction of motion of the relative wind and the direction of heading of the craft being normally parallel. Displacement of vane 60 from its normal position indicates a change between the heading of the aircraft and the relative wind or that the craft is slipping sidewardly or laterally. In other words, the displacement of vane 60 corresponds to the yaw condition of the craft.

The displacement of vane 60 through a suitable mechanical connection displaces the rotor 61 of an inductive device 62 to develop at stator 63 a signal whose phase and amplitude corresponds to the direction and extent of displacement of the vane. This signal, applied through a conventional discriminator type amplifier 66 and a conventional low pass filter 67 to a coil 68 surrounding armature 53, correspondingly displaces armature 53 to the left or to the right depending upon the signal phase.

In order that the movement of piston 44 will correspond in extent to the amplitude of the signal, the rotor 70 of a follow-up inductive device 71 is mechanically connected with shaft 43 of secondary servomotor 13 for displacement relative to stator 73. Thus, displacement of piston 44 builds up in stator 73 a signal which is in opposition to the signal in stator 63. When these signals become equal and opposite, the net input to amplifier 66 is zero; armature 53 is centered; and movement of piston 44 is stopped.

Pivot point 38 during this time has been relatively fixed so that the movement of pin 45 has rotated member 32 about pin 38. This moves spool 24, resulting in a movement of piston 21 and of pin 34 until member 30 has pivoted member 32 about point 45 to return spool 24 to centered position. Thus, the manual input is compensated to correct for any yawing tendency of the craft.

While the manual input and the yaw compensator actions have been discussed separately, it is apparent that the actions are interrelated and may be, and probably are, during the control of a craft occurring simultaneously.

The control system so far described is applicable to aircraft of conventional type. However, the novel arrangement of the present invention is particularly applicable for aircraft of the type which employ spoilers instead of conventional ailerons. As is well known, ailerons operate differentially, that is, while one aileron surface is moved upwardly the other surface is moved downwardly, this movement being in either direction from a neutral position. In contrast, only one spoiler surface is moved at any time for a control action, and this surface is moved only in one direction from a neutral position. The movement of the spoiler system disturbs the lift of one wing causing a change in altitude about that wing, thereby banking the craft.

Figure 2:
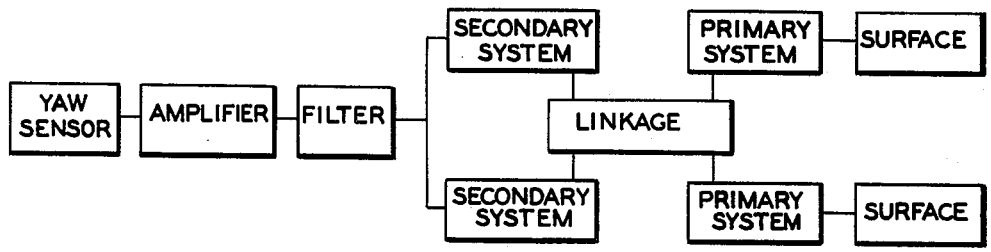
Fig. 2 illustrates in block form a novel arrangement of the invention illustrated in Fig. 1 for controlling an aircraft of the type whose control surfaces are known as spoilers.

To operate a spoiler surface with the above described device, an arrangement as in Figure 2 is provided so that each surface has a primary system comprised of a primary servo 10 and actuator 11, and a secondary system comprised of a secondary servo 13 and actuator 14. Linkage 12 connects with both systems. These units operate from the amplifier 66 and low pass filter 67 of the automatic compensating system 15. In each system, the relative position of rotor 70 and stator 73 of inductive device 71 is so adjusted that a null position of the follow-up device is reached only when piston 44 is at the extreme right position. The electrical transfer valve 14 is so connected that a signal in phase with reference voltage drives a piston 44 of one secondary servo to the right and a signal of the opposite phase drives the piston 44 of the other servo toward the right. When a signal of a phase corresponding to the main operating phase is applied to amplifier 66, one piston 44 of the secondary system is driven toward the left, the piston of the second system is unaffected since this piston is already at the extreme right position in the cylinder. Conversely a signal of opposite phase drives the second piston to the left, whereas the first piston remains at its extreme right position. Thus only one secondary servo motor 13 will be operated at any one time and the surface will be deflected only in one direction from neutral position.

In craft which employ spoiler surfaces for craft control, the operation of high lift flaps or their equivalent for take-offs or landings changes the character of the control by the spoiler surfaces. Therefore, the neutral position and the extent of travel of the surface with respect to the neutral position also changes.

In accordance with the present invention as the craft is placed in a configuration suitable for landing, switch 78 is closed and solenoid 79 is energized. Valve 80 moves to the right permitting fluid pressure P to flow into chamber 81 and force piston 82 to move relative to shaft 43 and against shoulder 83. The coaction of piston 82 with an abutment 84 fixed to shaft 43 limits the movement of shaft 43 to the right. The position of abutment 83 constitutes the new neutral position of piston 44 and pivot 45. Operation of piston 44 to the left of this position deflects a spoiler surface by moving linkage 12 to compensate the manual control for any yaw condition which might be detected by vane 60.

Since the possibility of a failure exists in an electrical system such as system 15 despite extreme care in the design, testing or maintenance of the components of the system, a novel arrangement is provided for locking pivot 45 in a safe position in the event of a failure of automatic compensating system 15. To this end, safety device 17 is placed in the conduit 90 between pressure source P and orifices 50 and 51 and in the conduit 56 between the secondary actuator 14 to the secondary servomotor 13.

Normally, switch 91 is in a closed circuit position, and spool 93 is held in the position shown during energization by battery 94 of the solenoid 95. Battery 94 also supplies excitation by means not shown to other parts of the system. Should a failure of this electrical circuit of the automatic compensating system 15 occur, solenoid 95 is deenergized. The bias of spring 96 moves spool 93 to the right, thereby stopping the flow of pressure fluid through conduit 90 and 56A and permitting pressure fluid to flow from P through conduit 56B so that piston 44 moves to the right, moving pivot 45 to a safe and fixed position. The manual input 42 then operates linkage 12 to pivot member 32 about pin 45 in this safe and fixed position.

The foregoing has presented a novel system for compensating the manual control of a craft for any side slipping or yaw condition to stabilize the craft about its lateral axis. The system is particularly adapted for aircraft of the type where only one surface is moved at a time to compensate for a change in condition of the craft. Novel provision is made for changing the neutral position of the surface and for operating the surface from this new neutral position by the manual input, the input being compensated also in response to any yaw condition of the craft.

I claim:

1. In a control system for an aircraft having a valve controlled fluid operated power means for moving a roll control surface, manually operable means connected with said control valve so that movement of said manually operable means operates said control valve, a second fluid operated power means for operating said control valve, electrical control means to effect operation of said second power means and thereby control operation of said first-mentioned power means by movement of said control valve regardless of the movement of the latter by said manually operable means, air flow sensing means carried by said aircraft and responsive to flow of air relative to said aircraft corresponding to the yaw condition of the craft, said airflow sensing means operating said electrical control means in such a manner as to effect movement of said control valve through said second power means whereby the manual operation of said roll control surface is compensated for the yaw condition of the craft, and independently operable means for limiting the operation of said second power means.

2. The combination defined by claim 1 in which the last-mentioned means includes fluid operated stop means for limiting the movement of the control valve by the second power means.

3. The combination defined by claim 1 in which said last-mentioned means includes a separately operable control means for transferring the second power means from an operative to an inoperative relation whereupon the manually operable means is effective to solely control the movement of the roll control surface through operation of the control valve.

4. The combination defined by claim 1 in which said last-mentioned means includes an emergency condition responsive control means for transferring the second power means from an operative to an inoperative relation whereupon the manually operable means is effective to solely control the movement of the roll control surface through operation of the control valve.

5. The combination defined by claim 1 in which said last-mentioned means includes a first fluid operated stop means for limiting the movement of the control valve by the second power means, second control means for transferring the second power means from an operative to an inoperative relation, and independent manually operable means for selectively operating said first and second means.

6. In a control system for an aircraft having a valve controlled fluid operated power means for moving a roll control surface, manually operable means connected with said control valve so that movement of said manually operable means operates said control valve, a second fluid operated power means for operating said control valve, electrical control means to effect operation of said second power means and thereby control operation of said first-mentioned power means by movement of said control valve regardless of the movement of the latter by said manually operable means, air flow sensing means carried by said aircraft and responsive to flow of air relative to said aircraft corresponding to the yaw condition of the craft, said air flow sensing means operating said electrical control means in such a manner as to effect movement of said control valve through said second power means whereby the manual operation of said roll control surface is compensated for the yaw condition of the craft, and an electrical follow-up device adjustably positioned by said second power means for developing a follow-up signal corresponding solely with the adjusted position of said second power means for opposing the operation of the electrical control means by the air flow sensing means whereby the extent of compensation of the manual operation of the roll control surface corresponds to the magnitude of the yaw condition.

7. The combination defined by claim 6 including a first fluid operated stop means for limiting the movement of the control valve by the second power means, second control means for transferring the second power means from an operative to an inoperative relation, and independent manually operable means for selectively operating said first and second means.

References Cited in the file of this patent

UNITED STATES PATENTS

| 2,162,862 | Protzen | June 20, 1939 |
| 2,371,388 | Glenny | Mar. 13, 1945 |
| 2,464,629 | Young | Mar. 15, 1949 |
| 2,678,177 | Chenery et al. | May 11, 1954 |
| 2,707,602 | Kaufman | May 3, 1955 |